US009000976B2

(12) United States Patent
Chen et al.

(10) Patent No.: US 9,000,976 B2
(45) Date of Patent: Apr. 7, 2015

(54) POSITIONING METHOD FOR LONG-THIN FLEET

(75) Inventors: Lien-Wu Chen, Taoyuan County (TW);
Chien-Cheng Wu, New Taipei (TW);
Yu-Chee Tseng, Hsinchu (TW)

(73) Assignee: National Tsing Hua University, Hsinchu (TW)

( * ) Notice: Subject to any disclaimer, the term of this patent is extended or adjusted under 35 U.S.C. 154(b) by 313 days.

(21) Appl. No.: 13/487,977

(22) Filed: Jun. 4, 2012

(65) Prior Publication Data

US 2013/0033396 A1 Feb. 7, 2013

(30) Foreign Application Priority Data

Aug. 5, 2011 (TW) .............................. 100128008 A

(51) Int. Cl.
| | | |
|---|---|---|
| *G01S 19/51* | (2010.01) | |
| *G01S 19/04* | (2010.01) | |
| *G01S 19/19* | (2010.01) | |
| *G01S 19/50* | (2010.01) | |
| *G01S 5/02* | (2010.01) | |

(52) U.S. Cl.
CPC ................. *G01S 19/04* (2013.01); *G01S 19/19* (2013.01); *G01S 19/50* (2013.01); *G01S 5/0289* (2013.01)

(58) Field of Classification Search
USPC .............. 342/357.34, 357.33, 357.28, 357.71
See application file for complete search history.

(56) References Cited

U.S. PATENT DOCUMENTS

2004/0225432 A1* 11/2004 Pilley et al. ................... 701/117
2008/0268873 A1 10/2008 Wymeersch et al.
2010/0250115 A1* 9/2010 Ohata et al. ................... 701/201

OTHER PUBLICATIONS

Kaisen Lin, Energy-Accuracy Trade-off for Continuous Mobile Device Location, MobiSys'10, Jun. 15-18, 2010, pp. 285-297.
Jeongyeup Paek et al., Energy-Efficient Rate-Adaptive GPS-based Positioning for Smartphones, MobiSys'10, Jun. 15-18, 2010, pp. 1-16.
Ionut Constandache et al., Enloc: Energy-Efficient Localization for Mobile Phones, IEEE Infocom Mini Conference, Jan. 22, 2009, pp. 1-5.
Zhenyun Zhuang et al., Improving Energy Efficiency of Location Sensing on Smartphones, MobiSys'10, Jun. 15-18, 2010, pp. 1-15.

* cited by examiner

*Primary Examiner* — Harry Liu
(74) *Attorney, Agent, or Firm* — Muncy, Geissler, Olds & Lowe, P.C.

(57) ABSTRACT

The present invention provides a positioning method for long-thin fleet, which moves along a direction and has a motion track and a leading member. The leading member is in forefront of the motion track. The positioning method comprises the following steps: a positioning step and a transmitting step. The positioning step gets a positioning data through a GPS in a preset time. The transmitting step transmits a periodic signal to the members of the fleet through a wireless network system. The leading member proceeds the positioning and transmitting steps. The motion track is connected according to the positioning data.

10 Claims, 4 Drawing Sheets

POSITIONING METHOD FOR LONG-THIN FLEET

BACKGROUND OF THE INVENTION (a) Field of the Invention

The invention relates to a positioning method, particularly to a positioning method for long-thin fleet.

(b) Description of the Related Art

Global positioning systems (GPS) are well known and not only can be built in a current commercialized portable electronic device but also can be extensively used in various mobile devices, such as a mobile phone. However, when the portable electronic device uses GPS, power consumption of the device becomes so high that its battery power is quickly used up within a very short time. Therefore, GPS is not suitable to turn on for a long time.

Furthermore, the majority of mobile devices have limited supply of electric power. For example, during the movement of a fleet, if GPS is turned on for a long time, additional power charging equipment is required. If the fleet is a bike fleet, users usually cannot have additional power charging equipment to result in increasing inconvenience.

BRIEF SUMMARY OF THE INVENTION

One object of the invention is to use a motion track (a path along which the fleet moves) of a fleet and cooperation among members of the fleet for positioning without additional charging equipment and without downloading map data in advance to further reduce the number of global positioning systems of the members to be turned on. Thus, the operable time of the network of the whole fleet can be further prolonged.

One embodiment of the invention provides a positioning method for a long-thin fleet, which moves along a direction and has a motion track and a leading member being in the forefront of the motion track. The method comprises a positioning step, acquiring positioning data through a GPS in a preset period of time; and a transmitting step, transmitting a periodic signal to members of the fleet through a wireless network system; wherein the leading member proceeds the positioning and transmitting steps and the motion track is connected according to the positioning data.

Since GPS requires consuming a lot of electric power during positioning and the battery on a mobile device only has limited electric power, the present invention uses the grouping characteristic of mobile devices and wireless communication to have the devices cooperate with each other while positioning. Thus, the number of global positioning systems of the members to be turned on can be reduced to achieve the similar speed of positioning and the similar positioning precision within a certain range or area.

Other objects and advantages of the invention can be better understood from the technical characteristics disclosed by the invention. In order to clarify the above mentioned and other objects and advantages of the invention, examples accompanying with figures are provided and described in details in the following.

DETAILED DESCRIPTION OF THE INVENTION

Figure 1A:
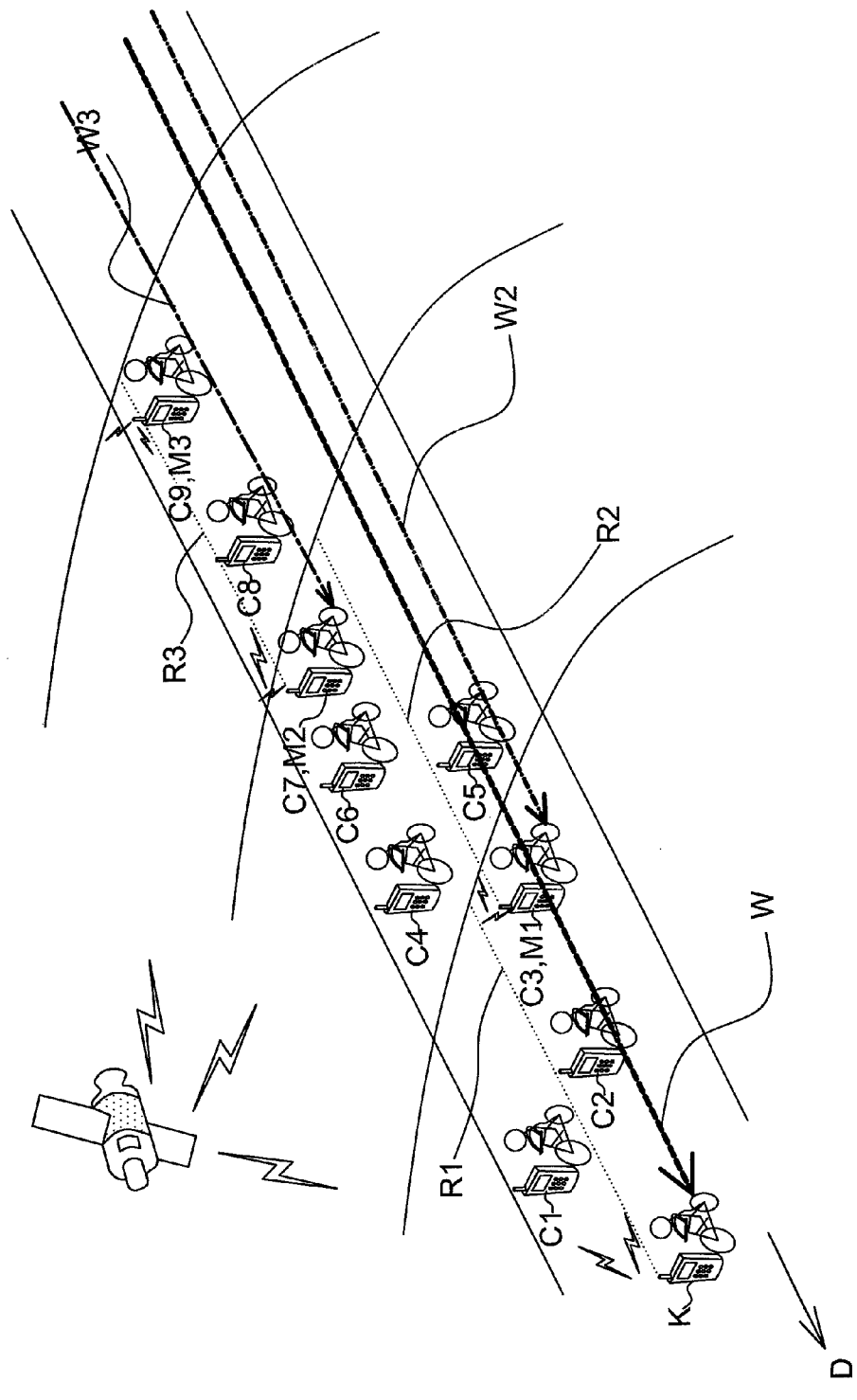
FIG. 1A shows a schematic diagram illustrating a positioning method for long-thin fleet according to one embodiment of the invention.

Please refer to FIG. 1A. FIG. 1A shows a schematic diagram illustrating a positioning method of long-thin fleet according to one embodiment of the invention. The long-thin fleet 100 includes a plurality of members C1~C9 and has a motion track W and a leading member K. The leading member K is in the forefront of the motion track W. In other words, the members C1~C9 follow the leading member K and move along the motion track W to advance toward a direction D In this embodiment, the leading member K and the members C1~C9 all carry mobile devices, such as mobile phones, and use the Wi-Fi wireless Ad Hoc network system to make the long-thin fleet 100 a long-thin network on the motion track. Thus, the leading member K and the members C1~C9 can perform signal transmission in the long-thin network.

It should be noted that the leading member K acquires positioning data every a preset period of time through a global positioning system (hereinafter referred to as "GPS") and transmits a periodic signal to the members C1~C3 within the signal reachable range through the Wi-Fi wireless Ad Hoc network system in the mobile device.

The periodic signal includes time data T, the positioning data P corresponding to the time data T and the motion track W corresponding to the time data T. The motion track W is formed by connecting a plurality of positioning data acquired by the leading member K every a period of time. The arc line in the figure shows the signal reachable range of the leading member K. In other words, the transmission radius of the leading member K through the Wi-Fi antenna is R1.

Then, for the members C1~C3 within the range of the transmission radius R1, an algorithm is used to calculate the distances between the members C1~C3 and the leading member K according to the positioning data and the motion track W to calculate the relative positions on the motion track W. Thus, the members C1~C3 can realize their locations without the need of turning on their GPS for positioning.

It should be noted that, in the positioning method for long-thin fleet according to the invention, the Wi-Fi wireless Ad Hoc network systems of the members C1~C3 each set a back-off time of the members C1~C3 to have the members C1~C3 count down according to its own back-off time and determine one member having the shortest back-off time in the members C1~C3 as a relay member M1. In this embodiment, the member C3 is the farthest away from the Wi-Fi wireless Ad Hoc network system of the leading member K and thus is the relay member M1.

After the countdown of the back-off time of the relay member M1 is finished, GPS of the relay member M1 is automatically turned on for positioning to acquire the current positioning data of the relay member M1. The relay member M1 transmits the periodic signal to the members C1~C7 within the signal reachable range through the Wi-Fi wireless Ad Hoc network system. In other words, the members C1~C2 receive the periodic signal transmitted by the relay member M1 before the countdown of the back-off time of the relay member M1 is finished. As shown in the figure, the relay member M1 has a transmission radius R2 through the Wi-Fi antenna and also has a corresponding motion track W2.

In one embodiment, a user can determine the length of the back-off time according to the distance between each of the members C1~C3 and the leading member K but the invention is not limited to this example. For example, if the signal transmission radius of the Wi-Fi antenna of the leading member K is 100 meters, the member having a distance of 100 meters with the leading member K sets its back-off time to 2 μs (micro seconds); the member having a distance of 70 meters with the leading member K sets its back-off time to 3 μs; and the member having a distance of 50 meters with the leading member K sets its back-off time to 5 μs.

In another embodiment, a user can determine the back-off time based on the remained power of the mobile devices of the members C1~C3. For example, the member having the more remained power of the mobile device has the shorter back-off time. Thus, since it is very power consuming during positioning by the GPS of the mobile device, the condition of a member having low remained power becoming the relay member M1 can be prevented.

When the members C4~C7 receive the periodic signal, the distances between the members C4~C7 and the relay member M1 are calculated according to the corresponding positioning data in the periodic signal through an algorithm and then the positions of the members C4~C7 are calculated further according to the motion track W2. In other words, the members C4~C7 within the transmission radius R2 calculate the distances between the members C4~C7 and the relay member M1 according to the positioning data of the relay member M1 and the motion track W2 through an algorithm to calculate the relative positions on the motion track W2.

The Wi-Fi wireless Ad Hoc network systems of the members C4~C7 each set a back-off time of the members C4~C7 according to their own positions to have the members C4~C7 count down according to their own back-off time and one member having the shortest back-off time in the members C4~C7 is determined to be a relay member M2. In this embodiment, the member C7 is the farthest away from the Wi-Fi wireless Ad Hoc network system of the relay member M1 and thus is the relay member M2. As shown in the figure, the relay member M2 has a transmission radius R3 through the Wi-Fi antenna and the relay member M2 also has a corresponding motion track W3.

By the same steps described previously, in this embodiment, the members C8~C9 can determine the last relay member M3 to be the member C9 and calculate the positions according to the distances with the relay member M2 and the motion track W3. The rest of principle is the same as that previously described and thus it will not be given hereinafter. At the time, the leading member K and the members C1~C9 keep repeating the above steps to carry out positioning.

It should be noted that the leading member K, the relay members M1 and M2 have the corresponding motion tracks W, W2 and W3, respectively, but the motion tracks W, W2 and W3 have the same moving path and direction. Thus, the motion track W can be considered to include the motion tracks W2 and W3.

In this embodiment, the relay member M1 positioned on the motion track W receives the periodic signals transmitted by the leading member K and the relay member M2. Similarly, the members C1~C2 positioned between the leading member K and the relay member M1 receive the periodic signals transmitted by the leading member K and the relay member M1. Thus, except the leading member K and the relay member M3 at the end, the relay members M1 and M2, the members C1, C2, C4~C6 and C8 positioned on the motion track W receive the periodic signals from its predecessor(s) and successor(s).

Figure 1B:
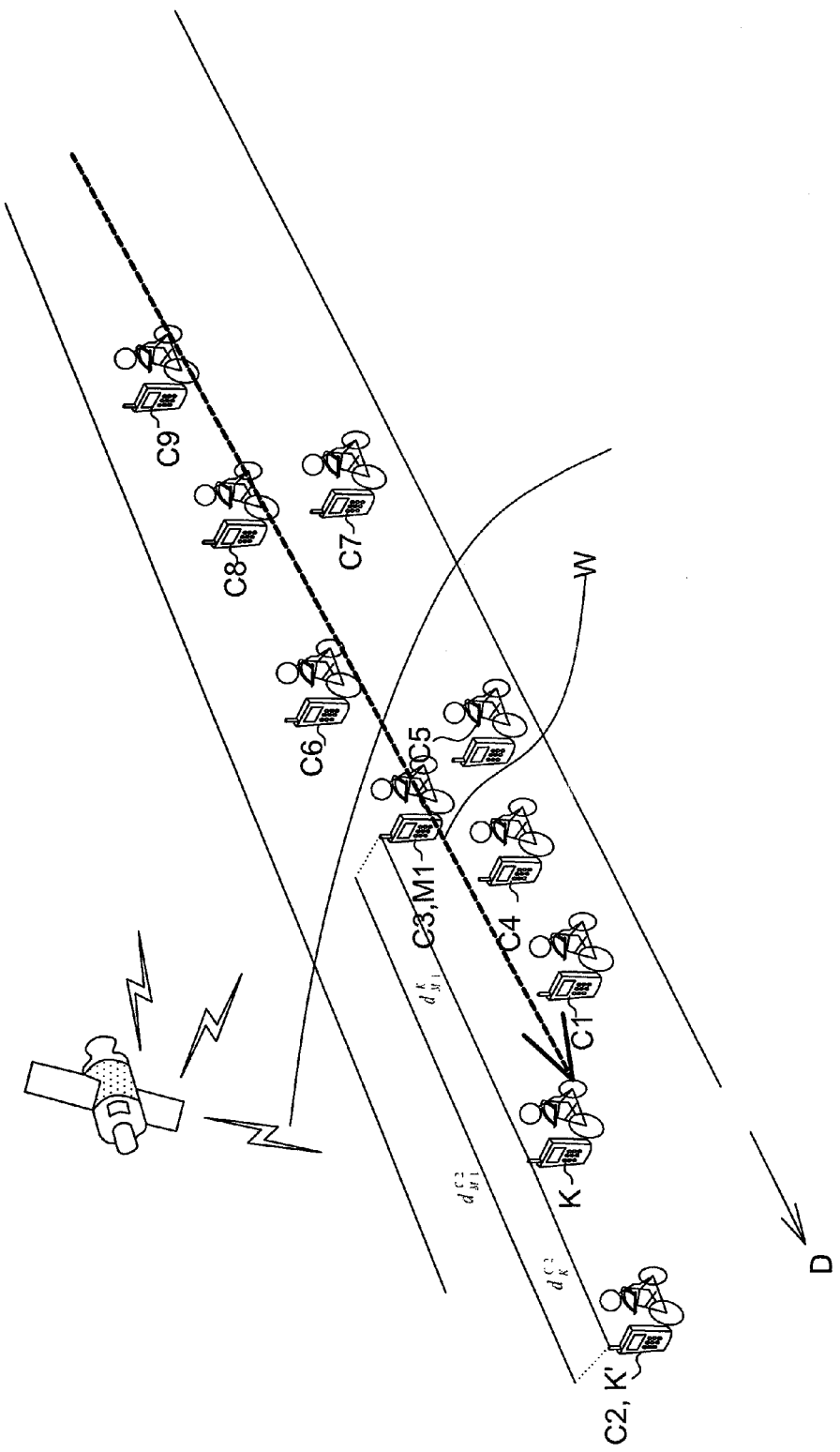
FIG. 1B shows a schematic diagram illustrating a positioning method for long-thin fleet according to one embodiment of the invention.

Please also refer to FIG. 1B. FIG. 1B shows a schematic diagram illustrating a positioning method for long-thin fleet according to one embodiment of the invention. In one embodiment of the invention, if one of the members C1~C9 overpasses the leading member K, for example, the member C2 passes over or is ahead of the leading member K, the member C2 can only receive the periodic signal from the leading member K at its back because the member C2 is beyond the signal reachable range of the relay member M1. At the time, the overpassing member C2 resets a new back-off time to carry out countdown. After the countdown is finished, the previously mentioned positioning step and transmitting step are executed. That is, the mobile device of the member C2 turns on GPS automatically to perform positioning and the periodic signal is transmitted to the members positioned within the signal reachable range of the member C2 through the Wi-Fi wireless Ad Hoc network system of the member C2.

It should be noted that, when the leading member K receives the overpassing member C2 and the relay member M1, the member C2 replaces the leading member K as a new leading member K'. Thus, each member in the long-thin fleet 100 can replace the leading member and repeatedly perform the previously mentioned steps for positioning, transmitting, calculating positions and determining relay members through the mobile device.

In this embodiment, the distances between the members C1~C3 and the leading member K, the distances between the members C4~C7 and the relay member M1, and the distances between the members C8~C9 and the relay member M2 can be calculated by the time of arrival (TOA) algorithm.

Figure 2:
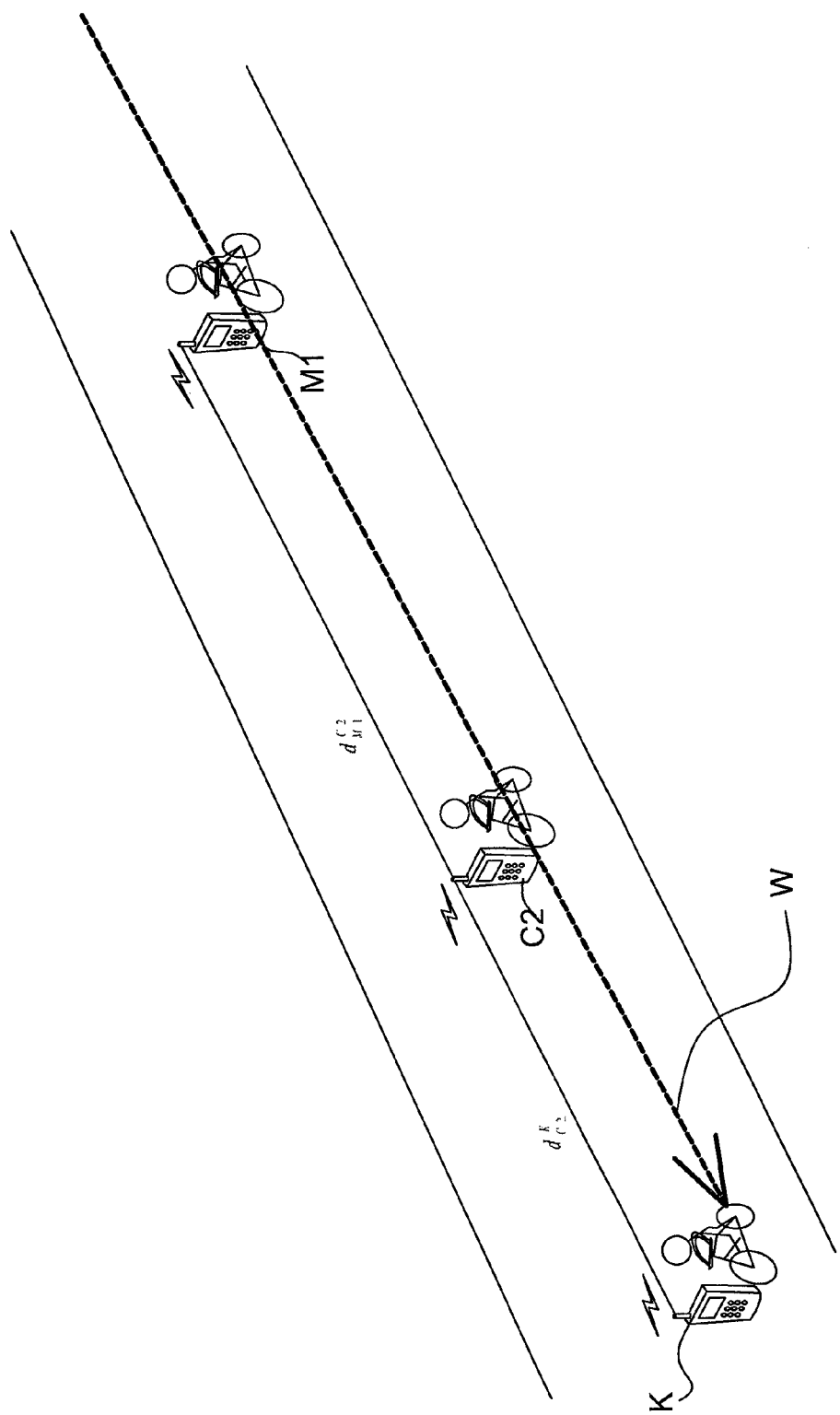
FIG. 2 shows a schematic diagram illustrating positions for the long-thin fleet according to one embodiment of the invention.

For example, please also refer to FIG. 2, showing the positions of the leading member K, the member C2 and the relay member M1. The arrow indicates the motion track W. It is assumed after the leading member K and relay member M1 finish positioning, the periodic data is transmitted to the member C2 at the time T1 and T2. The member C2 receives the periodic data of the leading member K and the relay member M1 at the time T3 and T4. Thus, the following equation (1) and (2) is used to calculate $d_{C2}{}^{K}$ and $d_{M1}{}^{C2}$.

$$d_{C2}{}^{K}=c\times(T3-T1) \tag{1}$$

$$d_{M1}{}^{C2}=c\times(T4-T2) \tag{2}$$

In the above equations, $d_{C2}{}^{K}$ is the distance between the leading member K and the member C2; $d_{M1}{}^{C2}$ is the distance between the member C2 and the relay member M1; and c is the speed of light ($3\times10^{8}$ m/s).

Then, the following equation (3) is used to calculate the position $P_{C2\_T3}$.

$$\sqrt{(P_{C2\_T3}-P_{K\_T1})^{2}}=d_{C2}{}^{K} \tag{3}$$

$$\sqrt{(P_{C2\_T4}-P_{M1\_T2})^{2}}=d_{M1}{}^{C2} \tag{4}$$

$P_{K\_T1}$ is the position of the leading member K at the time T1; $P_{C2\_T3}$ is the position of the member C2 at the time T3; $P_{M1\_T2}$ is the position of the relay member M1 at the time T2; and $P_{C2\_T4}$ is the position of the member C2 at the time T4. Thus, after the leading member K and the relay member M1 use GPS to complete positioning to acquire the corresponding positioning data, the position of the member C2 at each timing can be calculated through the equations (1)~(4) and the motion track W of the leading member K. Assumed that the position of member C2 is $(X_i, Y_i)$, the distance between leading member K and member C2 is $d_i$, motion track W (W={$(X_1,Y_1),(X_2,Y_2),\ldots,(X_n,Y_n)$}) is a set of all track points in the coordinates of X-axis and Y-axis which is from leading member K. Motion track W includes at least two track points and contains up to all track points collected in the Wi-Fi transmission radius. $(X_1, Y_1)$ is shown the latest position of leading member K; and $(X_n, Y_n)$ is shown the oldest position of leading member K. $(X_i, Y_i)$ can be solved by the following equation (a) and (b), where $X_i$ is between $X_j$ and $X_{j+i}$; and $Y_i$ is between $Y_j$ and $Y_{j+1}$.

$$d_i = \sqrt{(X_i - X_1)^2 + (Y_i - Y_1)^2} \quad (a)$$

$$\frac{(X_i - X_j)}{(Y_i - Y_j)} = \frac{(X_j - X_{j+1})}{(Y_j - Y_{j+1})}, \quad (b)$$

$$j = 1 \sim (n-1)$$

It should be noted that the above distance calculation method can carry out calculation through the coordinates of the members. For example, when the coordinate of the position $P_{K\_T1}$ of the leading member K at the time T1 is $(X_{K_{T1}}, Y_{K_{T1}})$ and the coordinate of the position $P_{C2\_T3}$ of the member C2 at the time T3 is $(X_{C2\_T3}, Y_{C2\_T3})$, the equation (3) can be rewritten into the following equation (5):

$$\sqrt{(P_{C2\_T3} - P_{K\_T1})^2} = \sqrt{(X_{K\_T1} - X_{C2\_T3})^2 + (Y_{K\_T1} - Y_{C2\_T3})^2} = d_{C2}^K. \quad (5)$$

In another embodiment, the distances between the members C1~C3 and the leading member K, the distances between the members C4~C7 and the relay member M1, and the distances between the members C8~C9 and the relay member M2 can be calculated by the received signal strength (RSS) algorithm. The equation of energy propagating in air of the periodic signal of Wi-Fi is shown in the following equation (6):

$$P_r = \frac{P_t \times G_t \times G_r \times \lambda^2}{(4\pi)^2 \times d^2 \times L} \quad (6)$$

In the above, $P_r$ represents the received power, $P_t$ represents the emitting power, d represents the distance, $G_t$ represents the emitting antenna gain, $\lambda$ represents the wavelength of the periodic signal of Wi-Fi, L is the systematic loss factor, and $\pi$ represents the ratio of the circumference of a circle to its diameter. The parameters except the distance d can be measured in advance.

If the leading member K transmits the periodic signal at the time T1, after the member C2 receives the periodic signal at the time T3, the signal strength $P_r$ can be measured. According to the equation (6), the distance between the leading member K and the member C2 can be calculated to be $d_{C2}^K$. Then, according to the positioning data of the leading member K in the periodic signal and the equation (3), the position $P_{C2\_T3}$ of the member C2 at the time T3 can be calculated.

Please refer to FIG. 1B again. The positioning method according to the invention can determine whether a member overpasses the leading member K or not based on the positions of each member and the leading member K or the distances between each member and the leading member K. It is assumed that the signal transmission radius of Wi-Fi antenna is 100 meters, the distance $d_K^{C2}$ between the member C2 and the leading member K is 30 meters, and the distance $d_{M1}^K$ between the leading member K and the relay member M1 is 50 meters. Since the member C2 is positioned within the signal reachable ranges of the leading member K and the relay member M1, the distance $d_{M1}^{C2}$ between the member C2 and the relay member M1 is compared with the distance $d_{M1}^K$ between the leading member K and the relay member M1. If the distance $d_{M1}^{C2}$ is larger than the distance $d_{M1}^K$ the member C2 overpasses the leading member K and the member C2 becomes a new leading member K'.

Figure 3:
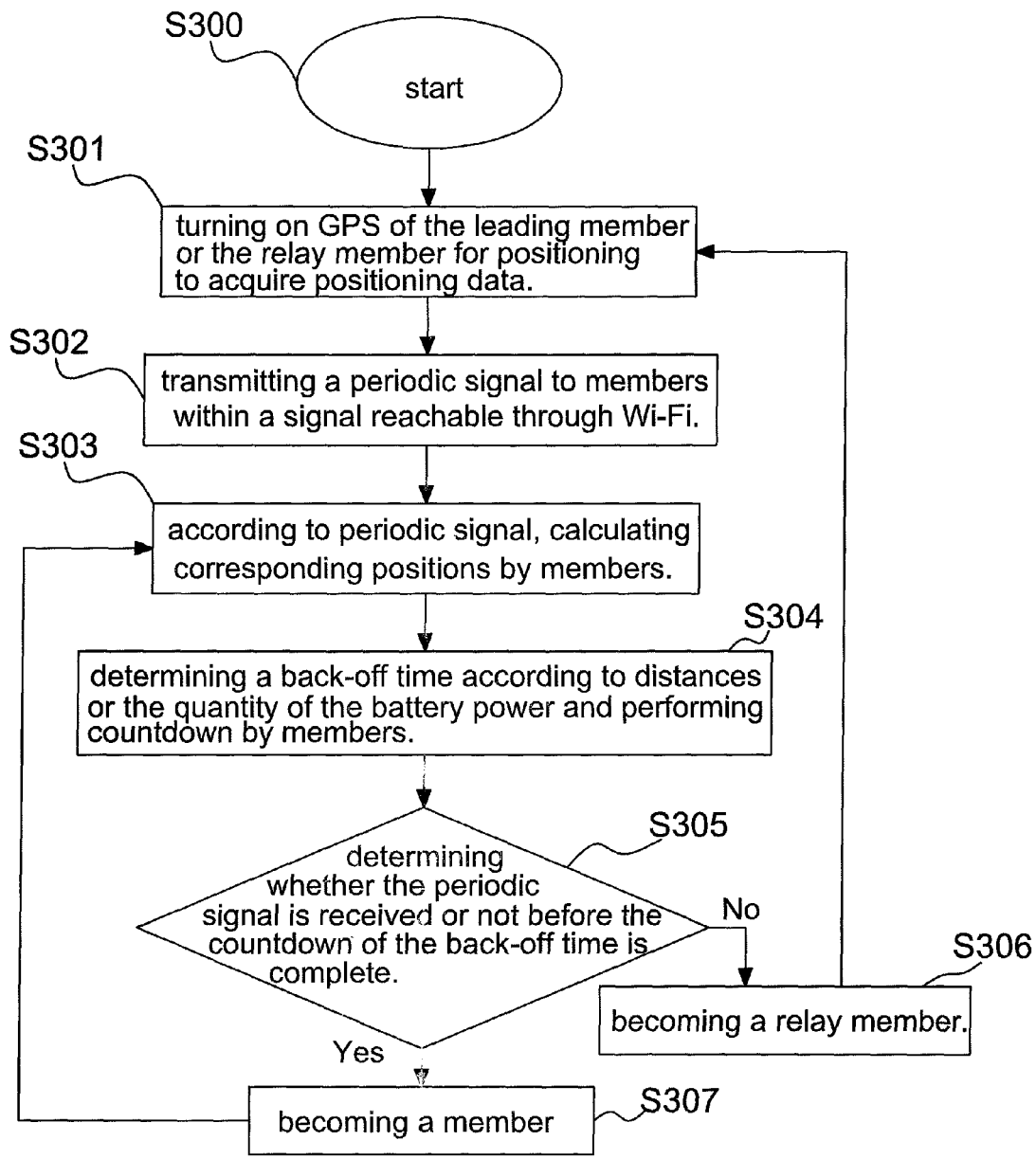
FIG. 3 shows a flow chart illustrating a positioning method for long-thin fleet according to the invention.

Please refer to FIG. 3. FIG. 3 shows a flow chart illustrating a positioning method for long-thin fleet according to the invention. The positioning method comprises the following steps:

Step S300: start;

Step S301: turning on GPS of the leading member or the relay member for positioning to acquire positioning data;

Step S302: transmitting a periodic signal to members within a signal reachable through Wi-Fi;

Step S303: according to time data, positioning data corresponding to the time data and motion track corresponding to the time data in the periodic signal, calculating corresponding positions by members;

Step S304: determining a back-off time according to distances or the quantity of the battery power and performing countdown by members;

Step S305: determining whether the periodic signal is received or not before the countdown of the back-off time is complete, jumping to step S306 if not, and jumping to step S307;

Step S306: becoming a relay member and jumping to step S301; and

Step S307: becoming a member and jumping to step S303.

In conclusion, since the battery power on a mobile device is limited, the present invention uses the grouping characteristic of mobile devices and wireless communication to have the devices cooperate with each other while positioning. Thus, the number of global positioning systems of the members to be turned on can be reduced to achieve the similar speed of positioning and the similar positioning precision within a certain range or area.

Although the present invention has been fully described by the above embodiments, the embodiments should not constitute the limitation of the scope of the invention. Various modifications or changes can be made by those who are skilled in the art without deviating from the spirit of the invention. Any embodiment or claim of the present invention does not need to reach all the disclosed objects, advantages, and uniqueness of the invention. Besides, the abstract and the title are only used for assisting the search of the patent documentation and should not be construed as any limitation on the implementation range of the invention.

What is claimed is:

1. A positioning method for long-thin fleet which moves along a motion track and a leading member being in the forefront of the motion track, the method comprising:
  a positioning step is executed by the leading member, acquiring positioning data through a GPS in a preset period of time;
  a transmitting step is executed by the leading member, transmitting a periodic signal comprising the positioning data to members of the fleet through a wireless network system;
  forming the motion track according to the positioning data is executed by the leading member; and
  calculating members' positions according to the motion track and the periodic signal is executed by the members of the long-thin fleet.

2. The method according to claim 1, further comprising:
  a position calculation step to calculate distances and members' positions of the long-thin fleet within a signal reachable range through an algorithm; and
  a relay member setting step to determine a back-off time of the members of the long-thin fleet according to the positions of the long-thin fleet within the signal reachable range and determine one relay member selected from one member having the shortest back-off time among the members of the long-thin fleet;

wherein the members of the long-thin fleet execute the position calculation step and the relay member setting step and the relay member is positioned in the signal reachable range of the wireless network system and is the farthest away from the wireless network system.

3. The method according to claim 2, wherein the relay members on the motion track separately receive the periodic signal transmitted by the leading member or its previous relay member and subsequent relay member.

4. The method according to claim 3, wherein the relay member at the end of the motion track receives the periodic signal transmitted by its previous relay member.

5. The method according to claim 2, wherein, when one member of the long-thin fleet overpasses the leading member, the member of the long-thin fleet replaces the leading member as a new leading member.

6. The method according to claim 3, wherein, when a member ahead of the members of the long-thin fleet is within the signal reachable range, the member only receives the periodic signal from the leading member and resets a new back-off time to count down and, after counting down, the member proceeds the positioning step and the transmitting step; and when the leading member receives the periodic signals from the member and the relay member, the member replaces the leading member as a new leading member.

7. The method according to claim 4, wherein, a member ahead of the members of the long-thin fleet is not within the signal reachable range, the member sets the new back-off time to count down and, after counting down, the member proceeds the positioning step and the transmitting step.

8. The method according to claim 2, wherein the algorithm is a time of arrival (TOA) algorithm to use a time difference between the time being transmitted and the time being received to calculate a distance and, according to the motion track and the distance, to calculate the members' positions of the long-thin fleet.

9. The method according to claim 2, wherein the algorithm is a received signal strength (RSS) algorithm to use a signal strength difference between the signal strength while transmitted and the signal strength while received to calculate a distance and, according to the motion track and the distance, to calculate the members' positions of the long-thin fleet.

10. The method according to claim 1, wherein the periodic signal comprises time data, the positioning data corresponding to the time data and the motion track corresponding to the time data.

* * * * *